United States Patent
Sugiyama et al.

(10) Patent No.: US 6,836,090 B2
(45) Date of Patent: Dec. 28, 2004

(54) BRUSHLESS MOTOR CONTROL SYSTEM

(75) Inventors: Yoshitaka Sugiyama, Kanagawa (JP); Toshimitsu Sakaki, Kanagawa (JP)

(73) Assignee: Hitachi Unisia Automotive, Ltd., Kanagawa (JP)

( * ) Notice: Subject to any disclaimer, the term of this patent is extended or adjusted under 35 U.S.C. 154(b) by 7 days.

(21) Appl. No.: 10/464,775

(22) Filed: Jun. 19, 2003

(65) Prior Publication Data
US 2004/0155613 A1 Aug. 12, 2004

(30) Foreign Application Priority Data
Jun. 20, 2002 (JP) .......................................... 2002-179631
Jun. 24, 2002 (JP) .......................................... 2002-182654

(51) Int. Cl.[7] .............................................. H02K 23/44
(52) U.S. Cl. ....................... 318/437; 318/254; 318/138; 318/439
(58) Field of Search ................................. 318/254, 138, 318/439, 437

(56) References Cited

U.S. PATENT DOCUMENTS

| | | | | |
|---|---|---|---|---|
| 5,298,839 A | * | 3/1994 | Takeda | ......................... 318/254 |
| 6,002,234 A | * | 12/1999 | Ohm et al. | ................... 318/729 |
| 6,694,287 B2 | * | 2/2004 | Mir et al. | .................... 702/183 |

* cited by examiner

*Primary Examiner*—Rita Leykin
(74) *Attorney, Agent, or Firm*—Sughrue Mion, PLLC

(57) ABSTRACT

A brushless DC motor control system is arranged to control a command current indicative of a current to be supplied to the brushless motor on the basis of an estimated phase angle and an actual phase angle to control a current supplied to the brushless motor on the basis of an estimated phase angle and an actual phase angle, and to execute at least one of an estimated phase angle returning processing for returning the estimated phase angle and a current lowering processing for lowering a command current, when the estimated phase angle advances relative to the actual phase angle.

15 Claims, 11 Drawing Sheets

FIG.4A TORQUE SIGNAL Vt (TORSION BAR TORQUE)

FIG.4B ESTIMATED PHASE ANGLE

FIG.4C PHASE-POSITION SIGNAL SWITCHING TIMING

FIG.4D COMMAND CURRENT

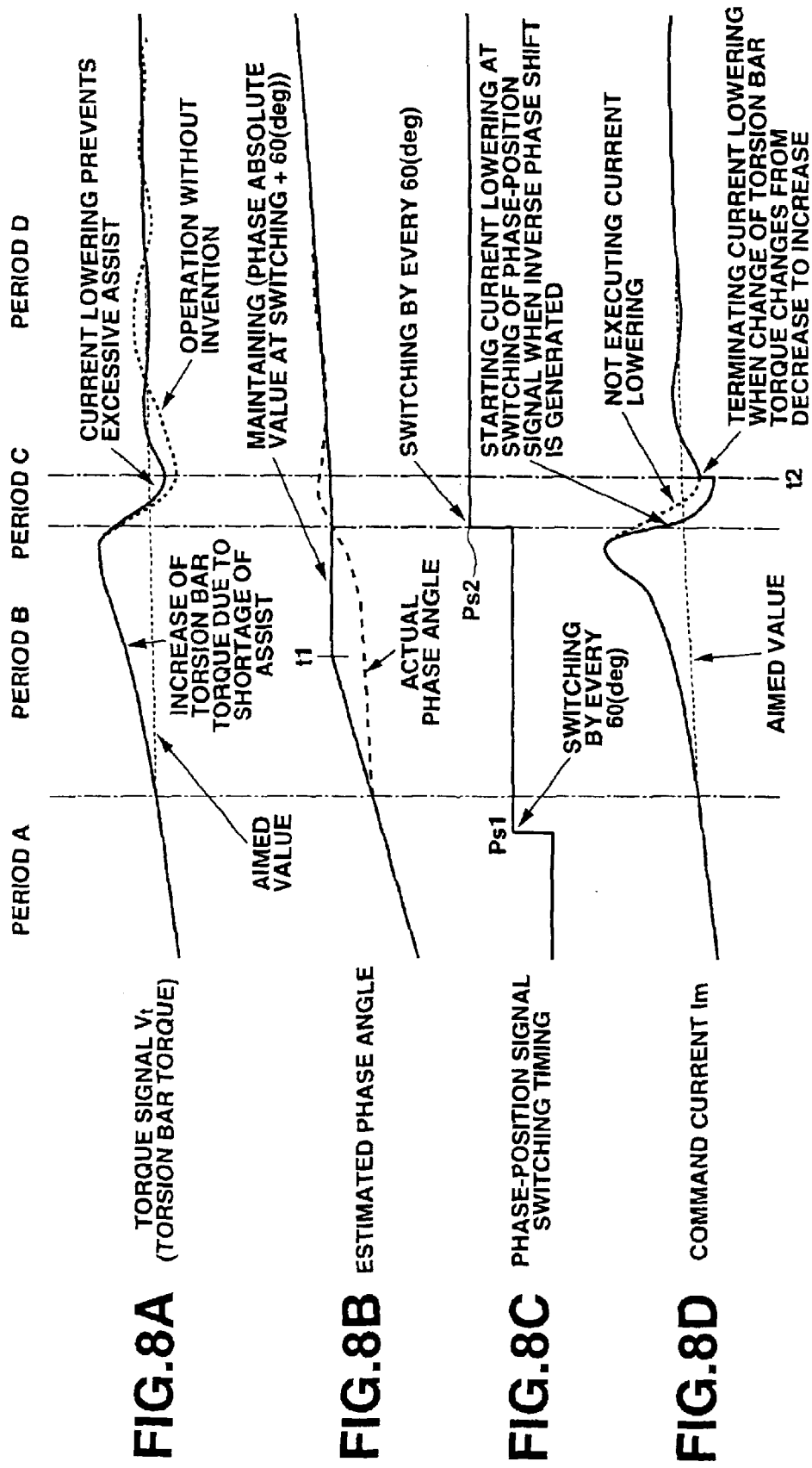

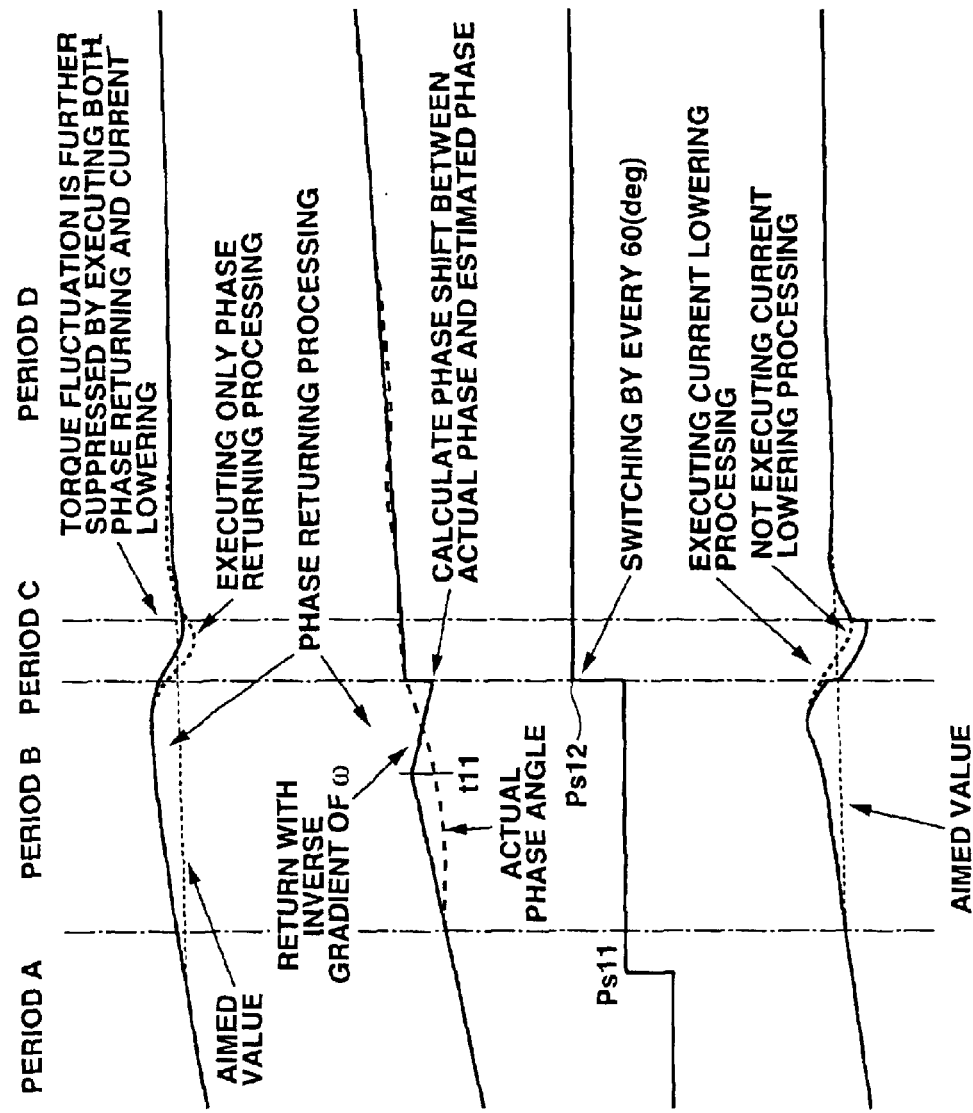

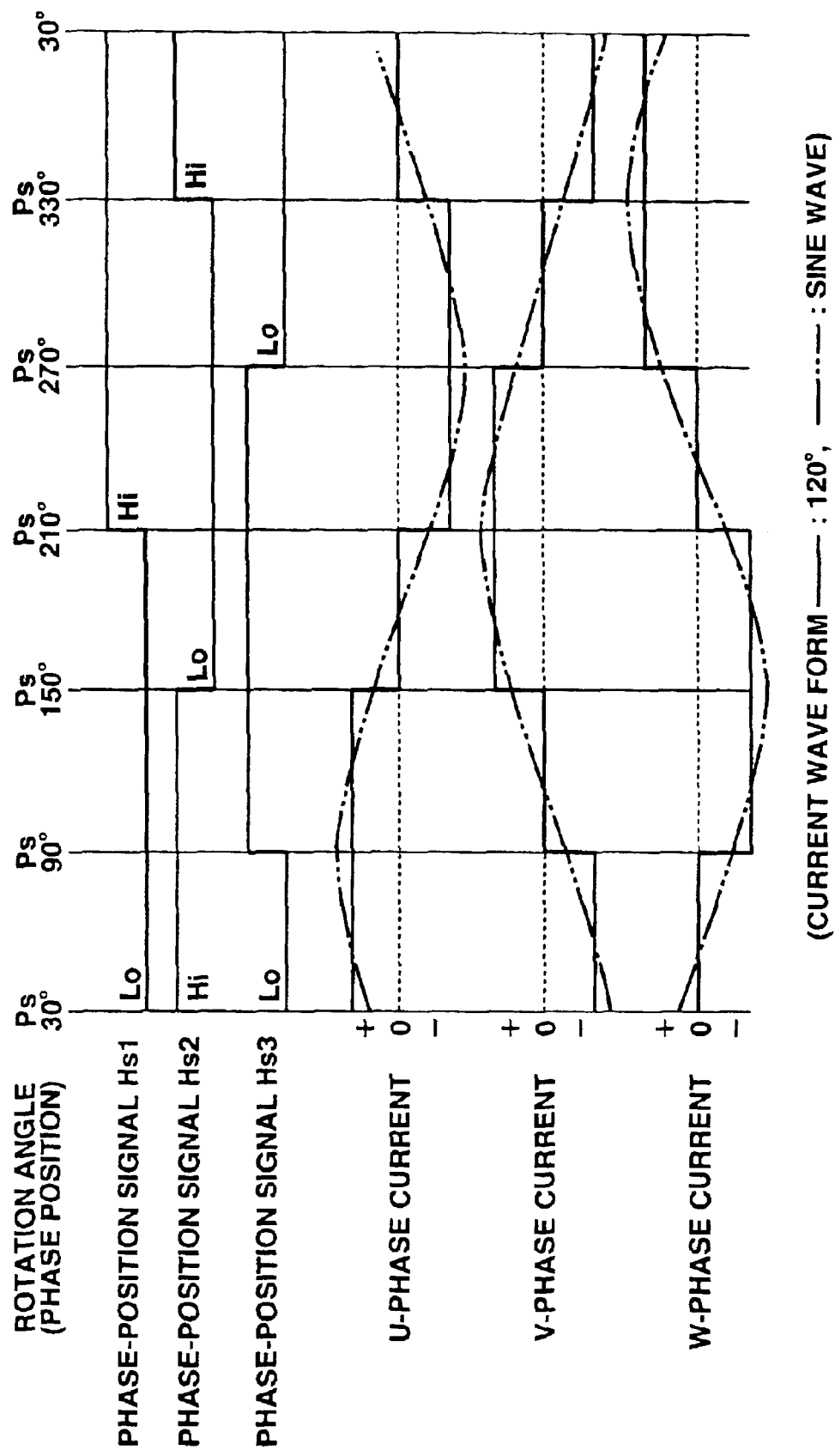

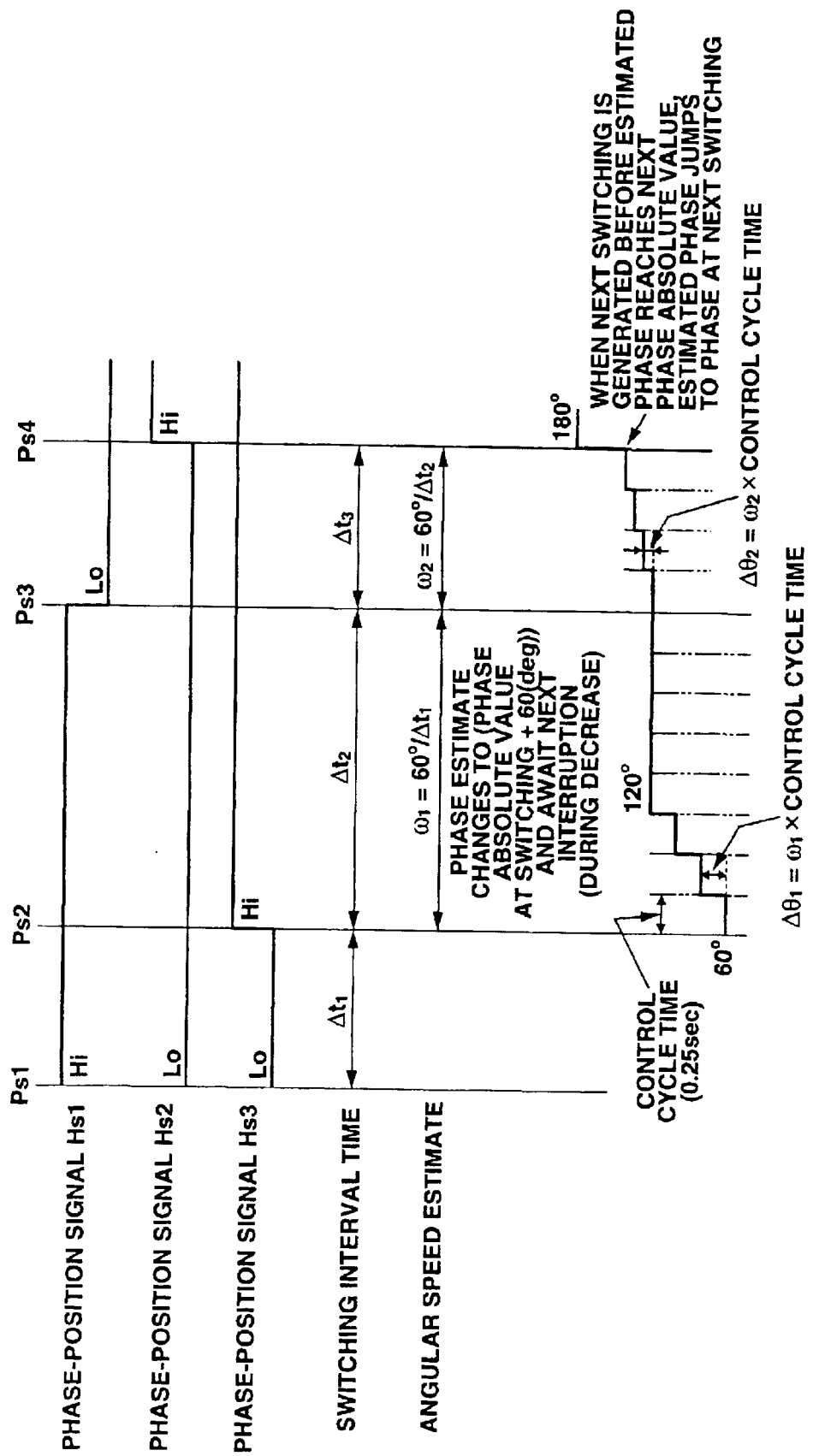

BRUSHLESS MOTOR CONTROL SYSTEM

BACKGROUND OF THE INVENTION

The present invention relates to a brushless motor control system which controls currents supplied to multi-phase coils of a brushless DC motor to effectively control the motor.

There has been proposed a brussless motor control system which is employed in a power assist system. This brushless motor control system is arranged to estimate a phase angle of a brushless DC motor by executing a phase-angle estimating method using inexpensive Hall-effect sensors. The power assist system employing the brushless motor control system is generally arranged to assist a manipulating force using a motor torque and is applied to a power steering system or a conveying system. The power assist system comprises load detecting means for detecting a load generated by an operator and controls a command current to the motor so as to bring the detected load closer to a target value. More specifically, the assisting force of the motor is increased by increasing the command current as the load increases. Inversely, the assisting force is decreased by decreasing the command current as the load decreases.

SUMMARY OF THE INVENTION

However, this proposed brushless motor control system has the following problem.

In the power assist system employing a motor torque as an assisting force, when an output torque is lowered due to the phase angle shift, the assisting force by the motor is lowered. As a result, the load (torque reaction) increases and the detection value of the load detection means also increases. Therefore, current control means of the power assist system increases the command current. As shown in FIGS. 4A through 4D, a phase angle shift is generated during a period B. The assisting force is decreased according to the lowering of the motor torque due to the phase angle shift, and therefore the torque signal outputted from the torque sensor increases and the command current also increases. Thereafter, the position signal Ps12 is obtained at the start of a period C, and an estimated phase angle is corrected to the actual phase angle obtained in response to the input of the position signal Ps12. Therefore, the effective current supply to the motor is achieved.

However, in this corrected state, the command current, which is generated so as to compensate the shortage of the assisting force, becomes excessive. That is, a torque signal Vt is lowered by the excess of the assisting force. This also lowers the command current inversely. Accordingly, in this related art, when the phase angle shift is generated by the advance of the estimated phase angle relative to the actual phase angle and when the position signal is obtained, overcurrent is outputted by the execution of the correcting processing for correcting the estimated phase angle to the actual phase angle. This generates a hunting of the torque and therefore an operator has a strange feeling to this proceeding in this control operation.

It is therefore an object of the present invention to provide an improved brushless motor control system which improves a controllability of a motor so as to suppress a hunting which is caused by overcurrent due to a phase angle shift, while estimating a phase angle of the motor by measuring a change and a time of a position signal using inexpensive Hall-effect sensors.

An aspect of the present invention resides in a motor control system which comprises brushless motor, a phase detector and a control unit, the brushless motor having multi-phase coils and generating a torque for assisting the operation of an input member, the phase detector detecting an actual phase angle of a rotor of the brushless motor at predetermined angle intervals, and the control unit being connected to the brushless motor and the phase detector, the control unit being arranged to calculate an estimated phase angle on the basis of the actual phase angle and an elapsed time from the detection moment of the actual phase angle detected by the phase detector, to control a command current indicative of a current to be supplied to the brushless motor on the basis of the estimated phase angle and the actual phase angle, and to execute at least one of an estimated phase angle returning processing for returning the estimated phase angle and a current lowering processing for lowering the command current, when the estimated phase angle advances relative to the actual phase angle.

Another aspect of the present invention resides in a method of controlling a brushless motor having multi-phase coils, the brushless motor generating a torque for assisting the operation of an input member, the method comprising the steps of: detecting an actual phase angle of a rotor of the brushless motor at predetermined angle intervals; calculating an estimated phase angle based on the detected actual phase angle detected by the phase detector and an elapsed time from the detection moment of the phase detector; controlling a command current indicative of a current to be supplied to the brushless motor on the basis of the estimated phase angle and the actual phase angle; detecting an advance of the estimated phase angle relative to the actual phase angle; and executing at least one of an estimated phase angle returning processing for returning the estimated phase angle and a current lowering processing for lowering the command current, when the estimated phase angle advances relative to the actual phase angle.

The other objects and features of this invention will become understood from the following description with reference to the accompanying drawings.

BRIEF DESCRIPTION OF THE DRAWINGS

FIGS. 8A through 8D are time charts showing an operation achieved by executing a current lowering processing of the second embodiment.

FIGS. 9A through 9D are time charts showing an operation achieved by executing the current lowering processing and the phase returning processing of a third embodiment.

FIG. 10 is time charts explaining a detecting condition and current supplying condition of Hall-effect sensors.

FIG. 11 is time charts explaining a phase estimation.

DETAILED DESCRIPTION OF THE INVENTION

Figure 1:
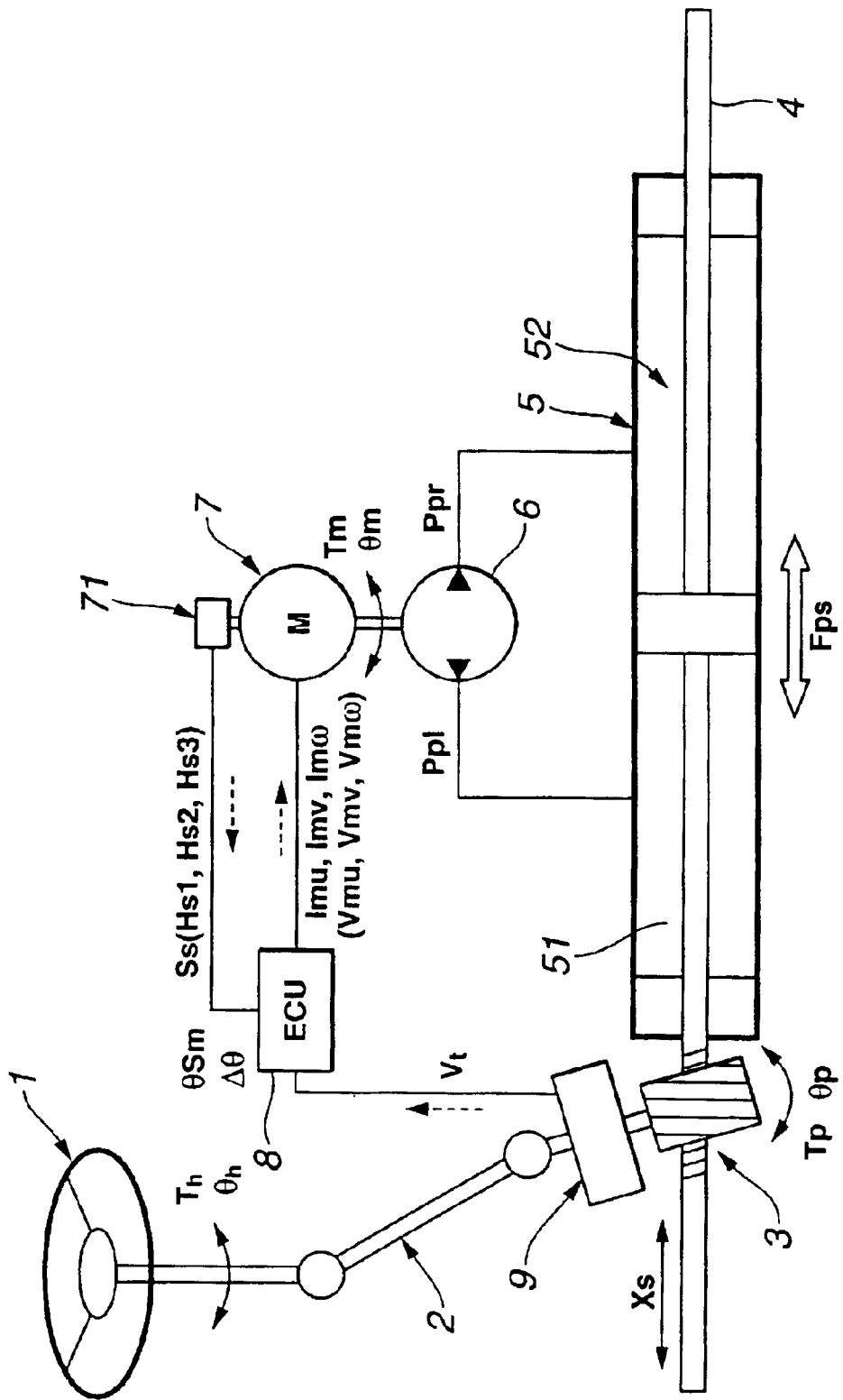
FIG. 1 is a schematic view showing a power steering apparatus to which a brushless motor control system of a first embodiment according to the present invention.

Before starting the explanation of embodiments of a brushless motor control system according to the present invention, there is discussed a basic motor control method and a basic phase angle estimating method pertinent to the embodiments according to the present invention so as to facilitate the understanding of the present invention.

In order to drive a brushless DC motor, it is necessary to detect a phase angle of a rotor of the motor and to switch the power supplied to coils according to the phase angle of the rotor. 120° current supplying method is simple in control and is commonly known.

Although this 120° current supplying method is a method of supplying current to two phases of three phases of a brushless motor, it is general that three Hall-effect sensors are attached to the brushless motor as a phase detecting means, and these Hall-effect sensors change signals respectively as the phase angle of a rotor of the motor changed at 60° intervals. Accordingly, the current supply pattern in the 120° current supplying method is varied according to the change of signals of the Hall-effect sensors.

FIG. 10 is an explanatory view showing a signal condition of the Hall-effect sensors and a current supply condition of the control system. As shown in FIG. 10, signals Hs1, Hs2 and Hs3 outputted from the Hall-effect sensors are changed respectively between a high-position output Hi and a low-position output Lo according to the rotational position (phase angle) of the rotor by 180°. These Hall-effect sensors are attached around the rotor at 120° intervals, and therefore it is possible to detect the phase angle of the rotor by 60°. The vertical changes at 60° intervals in FIG. 10 are herein called a position signal Ps. Accordingly, the supplied currents to U-phase, V-phase and W-phase are changed by switching currents to be supplied to U-phase, V-phase and W-phase among plus (+), zero (0) and minus (−) according to the input of position signal Ps corresponding to the phase angle of the rotor as shown in FIG. 10.

When the flowing direction of the current and the flux intersect at the right angle, the rotor most effectively generates a driving force. In contrast to this, since the 120° current supplying method is arranged to switch the current supply condition by each 60°, a state that the flowing direction of the current and the flux intersect at the right angle is achieved only at one angle within 60° angle range.

A sine-wave drive control method is known as a method of effectively operating a brushless motor as compared with the 120° current supply method. The sine-wave drive control method is a method of supplying currents having a sine-wave characteristic shown by two-dot chain lines. This method effectively controls the rotation of the rotor. Further, it is known that a motor control system of a related art is arranged to detect a reaction torque generated at a manipulating member such as a steering wheel and to vary a command current outputted to the motor according to the detected torque, if such a control method is employed in a power steering system to assist a driver's steering force.

However, the sine-wave drive control method requires to accurately detect a phase angle of a rotor since the current supply to the motor is controlled on the basis of the phase angle of the rotor. Therefore, it is necessary that the sine wave drive control method employs an expensive position sensor for accurately detecting the phase angle of the rotor.

On the other hand, there is known a phase angle estimation method using inexpensive Hall-effect sensors, which can detect the phase angle at 60° intervals (step by 60°). There is explained the phase angle estimation method of the rotor using Hall-effect sensors. The position signal Ps generated by the Hall-effected sensors is switched at 60° intervals as shown by references Ps1 through Ps4 in FIG. 11. Therefore, it is possible to estimate the angular speed of the rotor by measuring a period $\Delta t$ between the switching times.

Angular Speed (estimated value)$\omega$=60° (Inter-Switching Period $\Delta t$)

That is, since the position signal Ps is generated by switching the output of the Hall-effect sensors as shown in FIG. 11, it is possible to obtain the angular speed of the rotor during the inter-switching period by measuring a time period $\Delta t$ from the generation of a position signal Ps to the generation of the next position signal Ps. At every inputs of position signals Ps1, Ps2 and Ps3, the estimated phase angle is corrected to the actual phase angle by executing a correcting processing.

During a period from the input of a position signal Ps to the input of a next position signal Ps, the phase angle of the rotor is estimated on the basis of the angular speed. For example, a previous angular speed $\omega 1$ is obtained from the inter-switching period between the input of the present position signal Ps2 and the next position signal Ps3, and the estimated phase angle after receiving the present position signal Ps2 is obtained from the previous angular speed $\omega 1$ and the elapsed time. In FIG. 11, a control cycle time is 0.25 sec, and therefore a change quantity of the phase angle is obtained by multiplying the control cycle time and the previous angular speed $\omega 1$, and the estimated phase angle is obtained by adding the change quantity to the absolute value of the phase angle at the time when the position signal Ps2 is obtained.

However, as shown in FIG. 11, the angular speed $\omega$ is not constant. Accordingly when the actual angular speed of the rotor is lowered such that the inter-switching period is changed from a period $\Delta t1$ to a relatively long period $\Delta t2$ as shown in FIG. 11, a phase shift is generated between the estimated phase angle and the actual phase angle. This derives a condition that the actual phase angle has not yet reached the phase angle taken at the next time of generating the next position signal Ps3 although the estimated phase angle has already reached the phase angle taken at the next time.

In contrast, when the actual angular speed of the rotor is increased such that the inter-switching period is changed from a period $\Delta t2$ to a relatively short period $\Delta t3$ as shown in FIG. 11, a phase shift is generated between the estimated phase angle and the actual phase angle. This derives a condition that the actual phase angle has already reached the phase angle taken at the next time of generating the next position signal Ps4 although the estimated phase angle has not yet reached the phase angle taken at the next time.

Thus, in case that a difference between the actual phase angle and the estimated phase angle becomes large, the current direction relative to the flux is shifted toward a less effective side, and therefore the shortage of the torque is generated. Particularly, when the actual angular speed is smaller than the estimated angular speed such as during a period between the position signals Ps2 and Ps3, there is a possibility that the shift of the phase angle becomes 60° in maximum. Such a shift of the phase angle lowers the output torque of the motor at the rate of cos(shifted phase angle). For example, when the phase angle shift is 60°, the output torque becomes a half (cos 60° times=½ times) of the full output torque.

Referring to FIGS. 1 through 4, there is discussed a first embodiment of a brushless motor control system according to the present invention. In this first embodiment, the brushless motor control system is applied to a power steering apparatus of a motor-operated hydraulic type.

As shown in FIG. 1, a steering wheel 1 is connected to a rack and pinion 3 through a joint 2, so that a shaft 4 connected to front wheels (not shown) is moved laterally (in the direction of Xs in FIG. 1) according to a driver's steering operation through steering wheel 1. These members from steering wheel 1 through shaft 4 transfer a driver's steering force to front wheels and function as a manipulating member.

A hydraulic cylinder 5 is attached to shaft 4. Hydraulic cylinder 5 applies an assisting force to shaft 4 by supplying and discharging fluid such as oil to left and right chambers 51 and 52 according to the operation of a pump 6. The operation of pump 6 is controlled by the rotation of a brushless DC motor 7 having a three-phase coils, and a control unit 8 controls the rotation of motor 7. That is, the assisting force generated by hydraulic cylinder 5 relative to the steering operation force is determined by the operation of motor 7.

Control unit 8 receives a torque indicative signal Vt from a torque sensor 9, which is attached to joint 2 and detects a torque generated at joint 2 functioning as an input member, and a phase-position indicative signal Ss (Hs1, Hs2 and Hs3) from a position sensor 71, which is installed in motor 7 and functions as phase detecting means. Control unit 8 executes an estimation of a phase angle of motor 7 and a current control of motor 7, and therefore functions as phase estimating means and current control means.

Position sensor 71 comprises three Hall-effect sensors, and the Hall-effect sensors output respectively Hall-effect sensor signals Hs1, Hs2 and Hs3 which change between high position Hi and low position Lo at 180° (deg) phase intervals and whose phases are offset by 120° (deg) thereamong.

In FIG. 1, Th denotes a steering wheel torque, θh a steering angle, Xs a rack stroke, Tp a pinion gear torque, θp a pinion gear angle, Fsp an assist reaction force, and Vt a torque sensor signal. Imu, Imv, and Imw denote command currents of U-phase, V-phase and W-phase. Vmu, Vmv, and Vmw denote motor-drive voltage commands of U-phase, V-phase and W-phase. Tm denotes a motor torque, θm a motor phase, θSm an estimated phase angle of motor 7, and Δθ an estimated phase change quantity by a control cycle. Ppl and Ppr denotes pump left and right discharge pressures.

Figure 2:
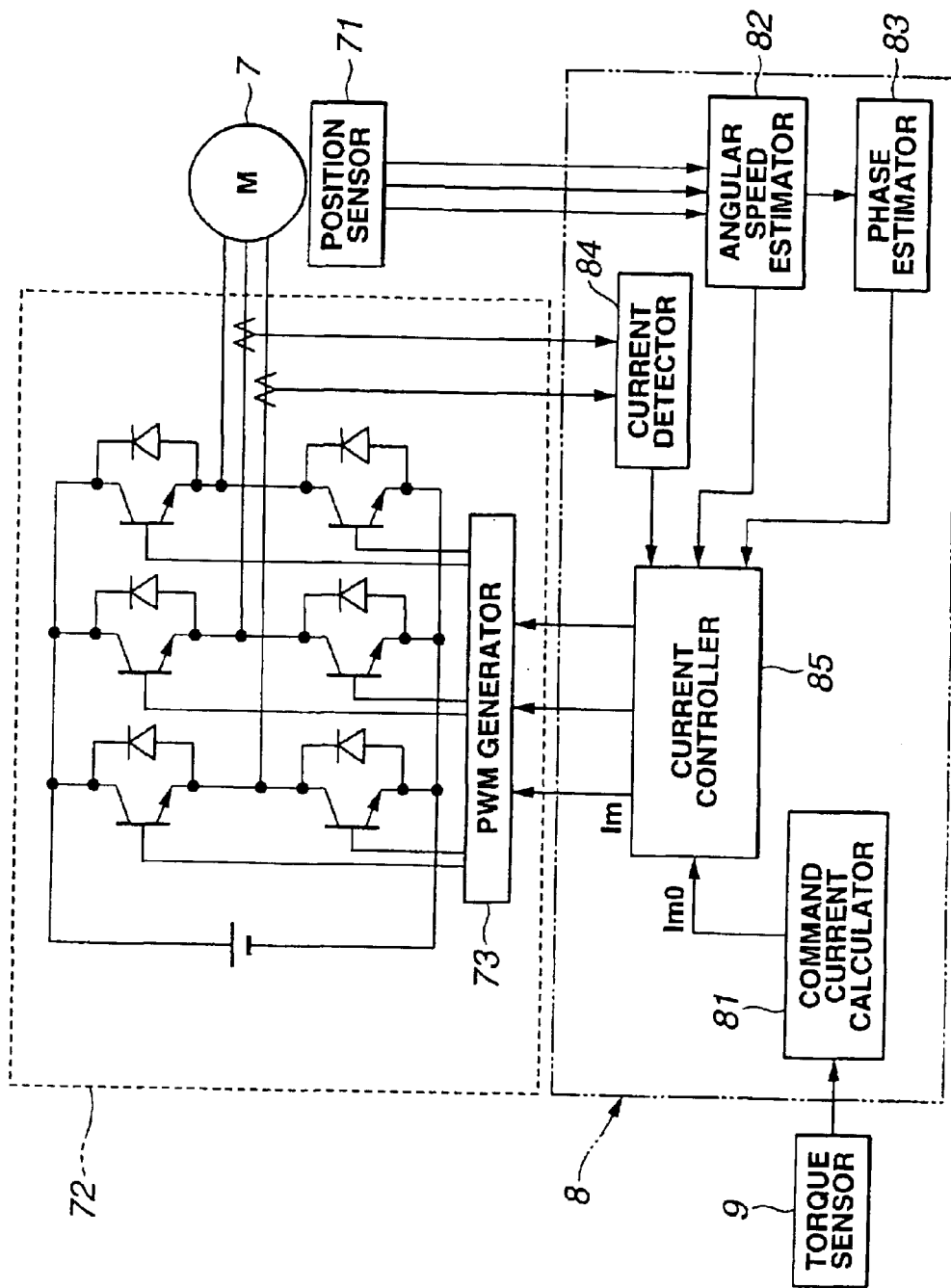
FIG. 2 is a block diagram showing a control unit and a motor drive circuit of the first embodiment.

FIG. 2 shows control unit 8 and a motor drive circuit 72. Control unit 8 comprises a command current calculator 81 which calculates a reference command current Im0 which increases as the detected torque increases according to the signal of torque sensor 9. Further, control unit 8 comprises an angular speed estimator 82 which estimates an angular speed of a rotor of motor 7 on the basis of the input from position sensor 71, a phase estimator 83 which estimates a phase of the rotor of motor 7 on the basis of the input from position sensor 71, and a current detector 84 which detects a motor-drive command current outputted to motor 7. Furthermore, a current controller 85 of control unit 8 outputs control signals Imu, Imv and Imw (command current Im) to a motor drive circuit 72 on the basis of signals outputted from command current calculator 81, angular speed estimator 82, phase estimator 83 and current detector 84.

Motor drive circuit 72 is connected to motor 7, and comprises a PWM generator 73 for generating a PWM current signal according to command current Im inputted.

Motor drive circuit 72 supplies the motor drive command currents for the vector control to U-phase, V-phase and W-phase of motor 7, respectively.

Figure 3:
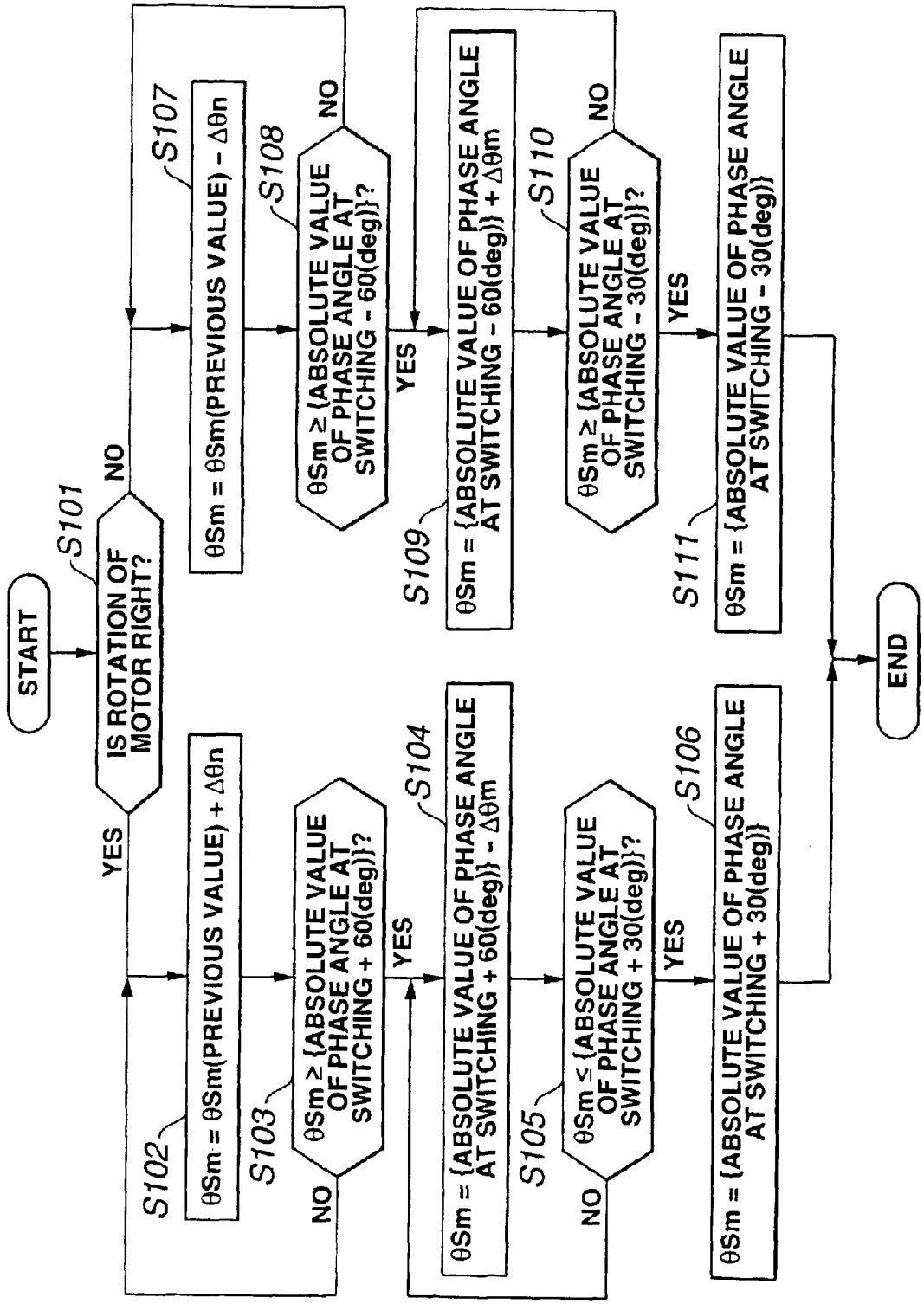
FIG. 3 is a flowchart showing a phase estimation processing and an estimated phase angle returning processing executed in the first embodiment.
Figure 4:
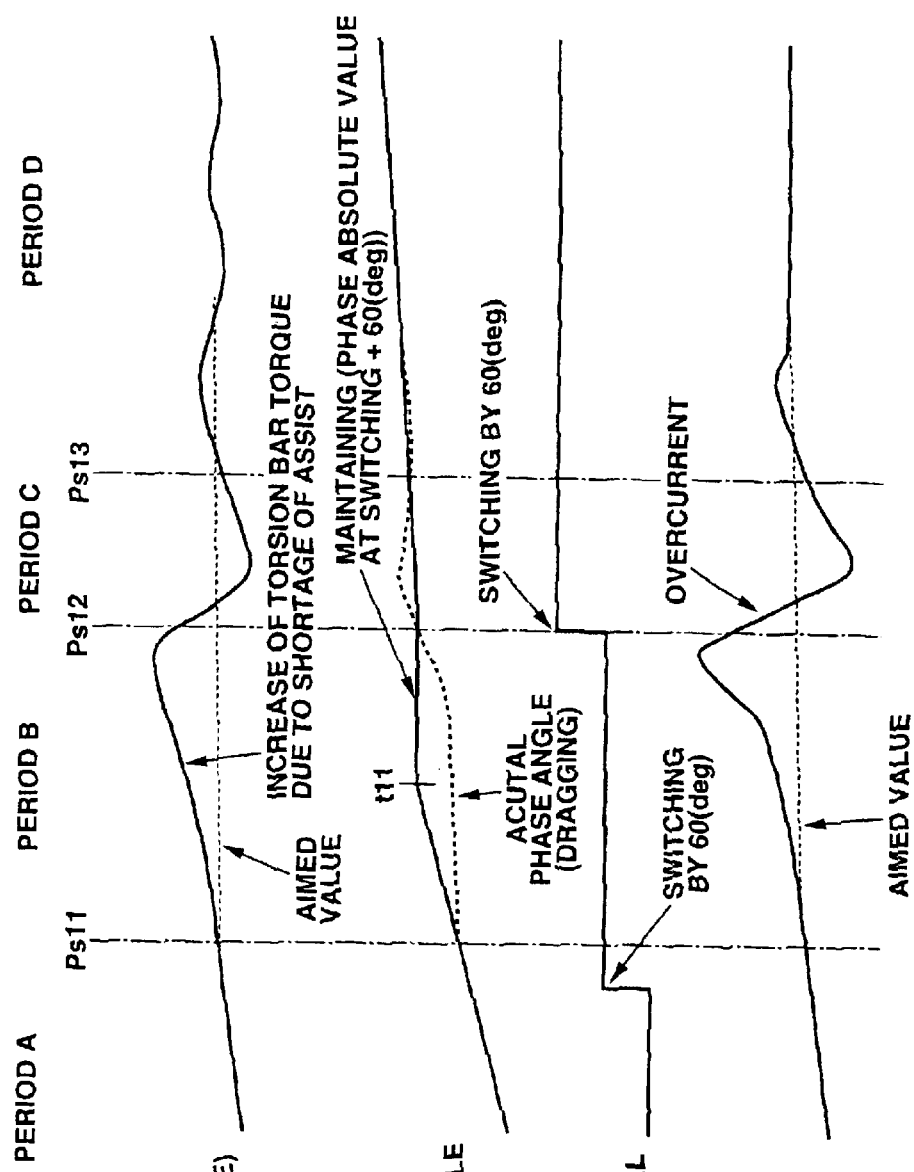
FIGS. 4A through 4D are time charts showing a compared operation without executing an estimated phase angle returning processing.
Figure 5:
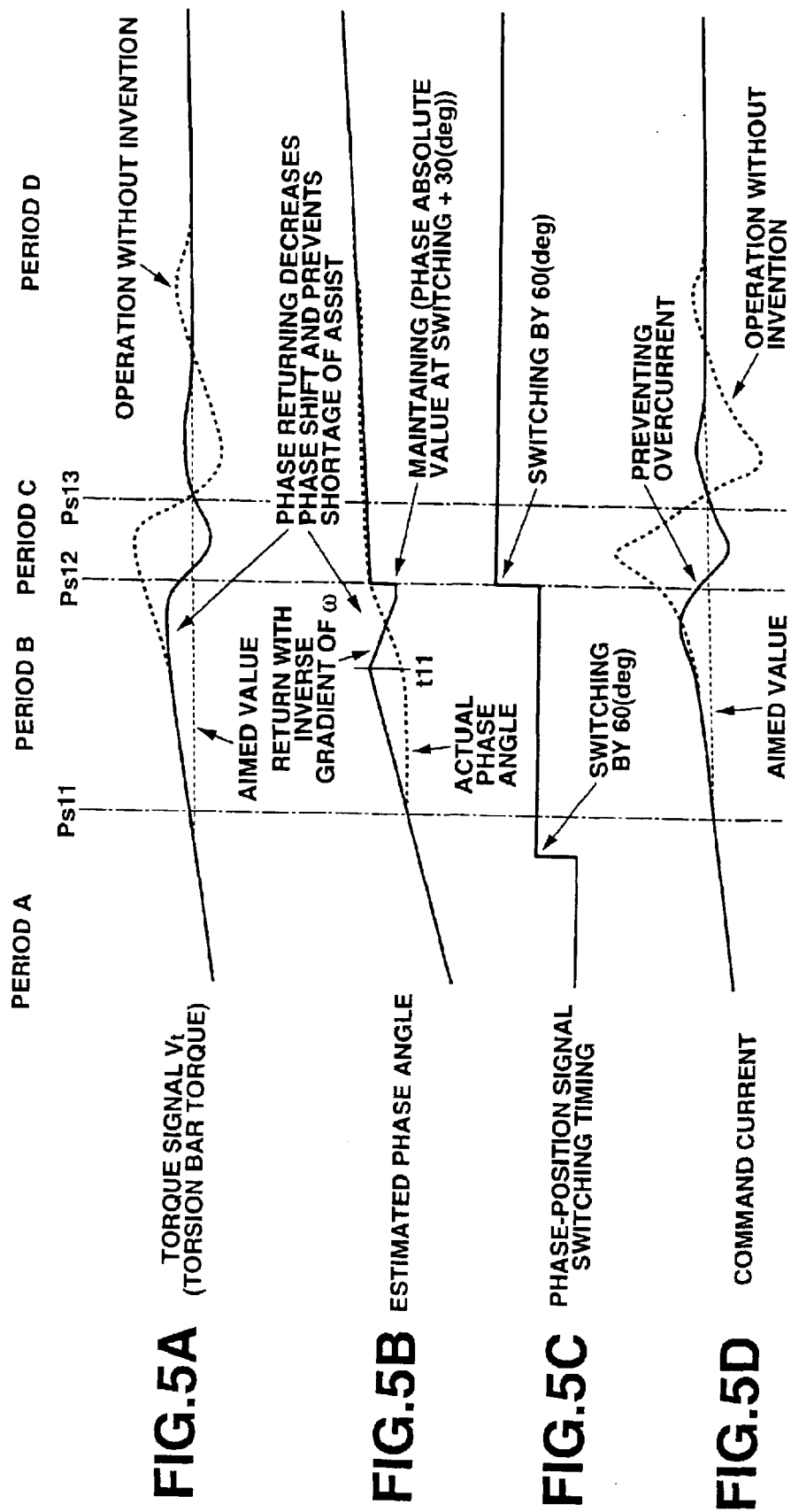
FIGS. 5A through 5D are time charts showing an operation achieved by executing the estimated phase angle returning processing of the first embodiment.

FIG. 3 is a flowchart showing an angular speed estimation processing executed by angular speed estimator 82 of control unit 8 and a phase angle estimation processing executed by phase estimator 83 of control unit 8.

A phase angle estimation method employed in this embodiment is discussed before starting the explanation of the flowchart of FIG. 3.

Position sensor 71 is capable of detecting the phase of the rotor of motor 7 by every 60° from position signal Ps obtained based on the switching of Hall-effect sensor signals Hs1, Hs2 and Hs3 between Hi and Lo as shown in FIG. 10.

Accordingly, an estimated phase angle θSm is updated to the rotor phase angle (actual phase angle) of motor 7 by every detection of position signal Ps. This update is an interruption processing executed by every input of position signal Ps and is called a correction processing. Control unit 8 for executing this correction processing corresponds to phase correction means.

During a period from inputting a position signal Ps(n) to a next inputting next position signal Ps(n+1), the phase angle estimation method is executed on the basis of a switching interval time Δt(n). As shown in FIG. 11, a previous angular speed ω1 is estimated on the basis of the previous switching interval time ωt1 by angular estimator 82, and the rotor phase angle of motor 7 is estimated on the basis of the previous angular speed ω1 upon taking account of the present time elapse.

Subsequently, there is discussed the flowchart shown in FIG. 3. The processing expressed by the flowchart of FIG. 3 is the angular speed estimation processing executed and the phase angle estimation processing and is executed by each input of position signal Ps(n). Throughout the explanation of the angular speed estimation processing, an absolute value of an phase angle at switching represents a magnitude of a steered angle from a neutral position (zero position) and is detected at 60° intervals.

At step S101 control unit 8 determines whether or not the rotation of motor 7 is a right rotation. When the determination at step S101 is affirmative, the program proceeds to step S102. When the determination at step S101 is negative, the program proceeds to step S107. Although this first embodiment according to the present invention has been shown and described such that the rotational direction of motor 7 is detected based on the motor drive command current detected by current detector 84, it may be detected based on steering-wheel steering angle θh detected by a steering angle sensor (not shown).

At step S102 control unit 8 calculates a present value of estimated phase angle θSm by adding a phase change quantity Δθn to the previous value of estimated phase angle θSm [θSm(present)=θSm(previous)+Δθ]. Further, the calculation of estimated phase angle θSm is discussed with reference to an example showing an interval between position signals Ps2 and Ps3 in FIG. 11. At a time when position signal Ps2 is obtained, an absolute value of the motor position (rotor position) is obtained as 60°. A phase change quantity Δθ starting from phase position 60° is obtained by multiplying a previous angular speed ω1 obtained based on the previous switching time period and a control cycle time (herein, 0.25 sec). Therefore, first phase change quantity Δθ1 is obtained by multiplying a previous angular speed ω1 and the control cycle time 0.25 sec (Δθ1=ω1×0.25 sec). Further, when the next control time elapsed, the next phase change quantity Δθ2 is obtained by multiplying a previous angular speed ω1 and the control cycle time 0.25 sec and 2 (Δθ2=ω1×0.25×2). That is, when the n-th times of control times elapsed, the phase change quantity Δθn at the n-th times is obtained by multiplying a previous angular speed ω1 and the control cycle time 0.25 sec and n (Δθn=ω1×0.25×n). Therefore, estimated phase angle θSm is first obtained by adding phase change quantity Δθ1 to the absolute value of the phase (60° in this case). Thereafter, estimated phase angle θSm is obtained by adding phase change quantity Δθn to the previous estimated phase angle θSm.

At step S103 control unit 8 determines whether or not estimated phase angle θSm is greater than or equal to the sum of the absolute value of the phase at switching and 60° (deg). When the determination at step S103 is negative, the program returns to step S102 wherein estimated phase angle θSm is calculated. When the determination at step S103 is affirmative, that is, when estimated phase angle θSm has reached the phase obtained at next switching of the position signal, the program proceeds to step S104.

That is, after each execution of step S102 for obtaining estimated phase angle θSm, the program proceeds to step S103 wherein the control unit 8 determines whether or not estimated phase angle θSm is greater than the phase angle obtained from the next position signal. In FIG. 11, the next detected actual phase angle at the time obtaining the next position signal Ps3 is 120°. Steps S102 and S103 are repeated until estimated phase angle θSm reaches the next phase angle at the time when the next position signal is obtained.

At step S104 subsequent to the affirmative determination at step S103, control unit 8 makes the phase shift determination that the phase shift is occurred, and executes the estimated phase angle returning processing. The estimate phase angle returning processing is a processing for subtracting the return change quantity Δθm from the sum of the phase absolute value at switching and 60°. For example, the sum is 120° in the estimation during a period from the phase absolute value 60° to the phase absolute value 120°. Although the first embodiment has been shown and described such that a product Δθn of a value obtained based on the previous angle speed ω and the control cycle time is employed as return change quantity Δθm, the invention is not limited to this and a predetermined value may be employed as return change quantity Δθm.

At step S105 subsequent to the execution of step S104, control unit 8 determines whether or not estimated phase angle θSm is smaller than or equal to the sum of the phase absolute value at switching (herein 60°) and 30°. The sum for the determination at step S105 is an intermediate value which is a half of the estimated phase angle during a period between the phase absolute value 60° and the phase absolute value 120°. Hereinafter, this value is called an intermediate value. When the determination at step S105 is negative, that is, when the sum is not smaller than the intermediate value, the program returns to step S104. When the determination at step S105 is affirmative, that is, when the sum is smaller than the intermediate value, the program proceeds to step S106.

At step S106 control unit 8 executes an estimated phase angle fixing processing for fixing estimated phase angle θSm at the sum of the phase absolute value at switching (60° in the above-discussed example) and 30°. More specifically, estimated phase angle θSm, which has once reached the phase absolute value (120° in the above-discussed example) to be next obtained is returned to the sum (90° in the above-discussed example) of the phase absolute value (60° in the above-discussed example) at switching and 30° by executing the processing of steps S104 through S106.

Finally, estimated phase angle θSm is fixed at the sum of the phase absolute value at switching (60° in the above-discussed example) and 30°.

The processing from step S107 through step S111 are executed when the phase angle is changed in the reverse direction (in the direction where the phase is represented by a negative value) relative to processing of steps S102 through S106. The algorithm employed in the processing of steps S107 through S111 is the same as that in the processing of steps S102 and S106.

At step S107 control unit 8 obtains the newest estimated phase angle θSm by subtracting phase change quantity Δθn from the previous estimated phase angle θSm. More specifically, estimated phase angle θSm is first obtained by subtracting phase change quantity Δθ1 from the absolute value of the phase. Thereafter, estimated phase angle θSm is obtained by subtracting phase-angle change quantity Δθn from the previous estimated phase angle θSm.

At step S108 control unit 8 determines whether or not an absolute value of estimated phase angle θSm is greater than or equal to a value obtained by subtracting 60° from the absolute value of the phase angle at the switching. When the determination at step S108 is negative, the program returns to step S107 wherein estimated phase angle θSm is again calculated. When the determination at step S108 is affirmative, the program proceeds to step S109.

At step S109 control unit 8 makes the phase shift determination and executes the estimated phase angle returning processing. The estimated phase angle returning processing is a processing for adding the return change quantity Δθm to a value obtained by subtracting 60° from the phase absolute value at switching. The product Δθn of a value obtained based on the previous angle speed ω and the control cycle time may be employed as return change quantity Δθm as is similar to the setting at step S107, or a predetermined value may be employed as return change quantity Δθm.

At step S110 subsequent to the execution of step S109, control unit 8 determines whether or not estimated phase angle θSm obtained by the execution of the estimated phase angle returning processing is greater than or equal to the difference obtained by subtracting 30° from the phase absolute value at switching. When the determination at step S110 is negative, that is, when estimated phase angle θSm is smaller than the difference, the program returns to step S109 to repeat the estimated phase angle returning process. When the determination at step S110 is affirmative, that is, when estimated phase angle θSm is greater than or equal to the difference, the program proceeds to step S111.

At step S111 control unit 8 executes the estimated phase angle fixing processing for fixing estimated phase angle θSm at the difference obtained by subtracting 30° from the phase absolute value at switching.

The processing represented by the flowchart of FIG. 3 is executed by each input of the position signal Ps as an interruption processing. Accordingly, when estimated phase angle θSm advances relative to the actual phase angle, the estimated phase angle returning processing corresponding to steps S104, S105 and S106 or steps S109, S110 and S111 is executed. Even when the estimated phase angle returning processing is being executed, if the next position signal is inputted at the time before the estimated phase angle reaches the intermediate value, the next phase-angle absolute value correction processing starts.

That is, in case that the present switching interval Δt2 is longer than the previous switching interval Δt2 as shown in FIG. 11, estimated phase angle θSm obtained based on estimated angular speed ω1 reaches the phase absolute value (120°) before the next position signal Ps3 is inputted. Therefore, in this situation, the estimated phase angle returning processing is executed.

On the other hand, when the switching interval Δt3 is shorter than the previous switching interval Δt2 as is the time after position signal Ps3 is inputted, the actual phase advances relative to estimated phase angle θSm, and therefore position signal Ps4 is inputted before estimated phase angle θSm reaches the next phase absolute value. Accordingly, estimated phase angle θSm starts the phase absolute value 180° in the next interruption processing.

Subsequently, the manner of operation of the first embodiment according to the present invention is discussed.

FIGS. 4A through 4D show a comparative operation in case that the estimated phase angle returning processing is not executed. FIGS. 5A through 5D show an operation in case that the estimated phase angle returning processing according to the first embodiment of the present invention is executed. This operation is represented on the assumption that steering wheel 1 is steered to the plus direction (+direction).

In both cases, steering wheel 1 is steered during a period A, and therefore the actual angular speed is decreased due to the fluctuation of load. Then, during a period B, the estimated phase angle advances relative to the actual displacement shown in a period between Ps2 and Ps3 in FIG. 11. More specifically, at a time t11 in the period B the estimated phase angle reaches the value corresponding to the next detected actual phase angle obtained at the time when the position signal Ps12 is obtained, and thereafter the value at the time t11 is used as the estimated phase angle until the next position signal Ps12 is obtained in the related art shown in FIGS. 4A through 4D. When a phase shift between the actual phase angle and the estimated phase angle is occurred as shown in the period B in FIGS. 4A through 4D, the torsion bar torque is increased due to the shortage of the assisting force, and therefore steering force of steering wheel 1 increases. Further, since the command current increases in response to the increase of the torsion bar torque, the motor torque increases, and therefore the phase shift decreases.

Although the actual phase angle is obtained at the time when position signal Ps12 is obtained, during a period C the command current takes an excessive value, that is, overcurrent is applied to motor 7 so as to generate the assisting force excessively. This excessively decreases the load to steering wheel 1 (decreasing the torsion bar torque). Therefore, the current value is decreased to suppress the assisting force. However, since the torque during the period C is suddenly changed, the command current converges while generating hunting (fluctuation). This fluctuation applies a strange feeling in steering operation to a driver. Further, there is a possibility that this kind of fluctuation is continuously generated, and thereby promoting the strange feeling in the steering operation.

On the other hand, in FIGS. 5A through 5D representing the operation according to the first embodiment of the present invention, when estimated phase angle θSm reaches the sum of the phase absolute value at switching and 60° (θSm≧phase absolute value at switching+60°) and when the next position signal Ps12 is not yet generated, the program of FIG. 3 proceeds in the order of step S101, step s102, step S103 and step S104 to execute the estimated phase angle returning processing when steering wheel 1 is steered in the plus direction. Therefore estimated phase angle θSm is decreased by the execution of the estimated phase angle returning processing. This decreasing of estimated phase angle θSm is terminated at a time when estimated phase angle θSm reaches a value obtained by adding the phase absolute value at switching and 30° (θSm≦phase absolute value at switching+30°). This value called an intermediate value is maintained until the next position signal is inputted.

With the thus arrangement according to the first embodiment, since estimated phase angle θSm is returned to the intermediate value, during the period B estimated phase angle θSm approaches the actual phase angle shown by a dotted line, crosses with the actual phase angle, and then takes a value smaller than the actual phase angle.

Although in the time chart shown in FIGS. 5A through 5D estimated phase angle θSm is returned to the intermediate value by the execution of the estimated phase angle returning processing, this returning depends on the timing of obtaining the actual phase angle corresponding to the next position signal Ps12. If the position signal Ps12 is obtained before estimated phase angle θSm is returned to the intermediate value, the estimated phase angle returning processing is terminated before estimated phase angle θSm is returned to the intermediate value.

In the operation shown by the time chart of FIGS. 5A through 5D, estimated phase angle θSm is decreased to the intermediate value, which is smaller than the actual phase angle, and is maintained at the intermediate value. During this period, estimated phase angle θSm is returned to the intermediate value always after crossing with a point at which a good torque efficiency is ensured. Further, the intermediate value can generate the torque corresponding to that generated by the conventional 120° power supply method, relative to the motor phase angle of the next switching timing. That is, the intermediate value, which is a value obtained by returning the absolute value determined at the input of the next position signal Ps12 by 30°, has a maximum shift angle 30° even if it is maximally shifted relative to the actual phase angle toward the plus side or minus side. Accordingly, the output torque ensures cos 30° (≈0.87) of the torque, even if the maximum phase shift is generated. This is apparently effective as compared with cos 60° (=½) of the torque in case of the maximum phase shift in the related art.

Therefore, the arrangement of the first embodiment enables torque signal Vt corresponding to the torsion bar torque to be set small and the command current to be also set small, as compared with the arrangement of the related art of FIGS. 4A through 4D in that estimated phase angle θSm is kept at the phase absolute value at the time when the next position signal Ps12 is inputted. Consequently, the arrangement of the second embodiment prevents the generation of overcurrent.

Then, as is shown during the period C in FIGS. 5A through 5D, at the time when the actual phase angle is obtained in response to the input of position signal Ps12, the increased quantity of the command current for filling up the shortage of the assisting force is regarded as an overcurrent and therefore the command current is decreased. However, this decreased quantity of the command current is smaller than that in the related art shown in FIGS. 4A through 4D. Accordingly, the torsion bar torque of the first embodiment is quickly converged as compared with that of the related art shown in FIGS. 4A through 4D. This performance of the first embodiment according to the present invention suppresses the generation of the torque fluctuation generated in the related art.

Referring to FIGS. 6 through 8D, there is discussed a second embodiment of the brushless motor control system according to the present invention. The second embodiment is specifically arranged to execute a current lowering processing. The basic construction of the second embodiment is basically the same as the first embodiment shown in FIGS. 1 and 2, and therefore the explanation thereof is omitted herein.

Figure 6:
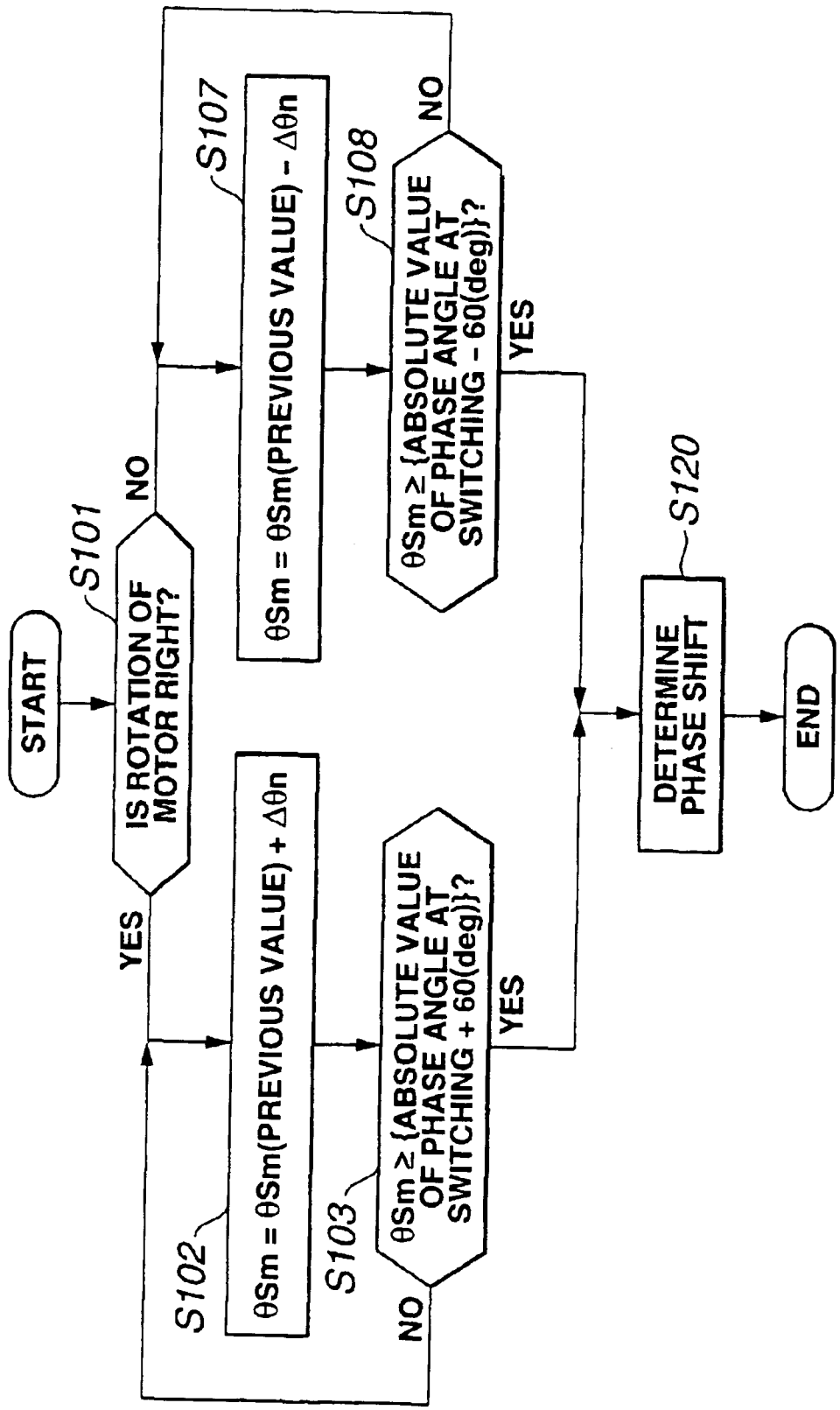
FIG. 6 is a flowchart showing a phase estimation processing and a phase shift detection processing executed in a second embodiment.

In the second embodiment, the phase angle estimation processing is executed based on a flowchart shown in FIG. 6. The flowchart shows the a motor angular speed estimation processing executed by angular speed estimator 82 of control unit 8 and the phase angle estimation processing executed by phase estimator 83 of control unit 8. The phase angle estimation processing employed in the second embodiment is also the same as that employed in the first embodiment, which method has been explained with reference to FIG. 11. Therefore, the explanation of this phase angle estimation processing is also omitted herein.

The flowchart of FIG. 6 is facilitated as compared with the flowchart of FIG. 3 in the first embodiment. More specifically, steps S101, S102, S103, S107 and S108 in FIG. 6 are completely the same as those in FIG. 3, and a step S120 is newly added instead of steps S104, S105, S106, S109, S110 and S111 employed in the first embodiment. Therefore, the explanation is made only as to step S120.

Subsequent to the affirmative determination at step S103 or S108, the program proceeds to step S120 wherein control unit 8 determines that estimated phase angle θSm advances relative to the actual phase angle to generate a phase shift between estimated phase angle θSm and the actual phase angle. That is, the program proceeds to step S120 when the next position signal Ps is not obtained although estimated phase angle θSm has already reached the phase angle obtained at the time of the next position signal Ps. This step S120 for executing the phase shift determination functions as phase shift detecting means.

The processing shown in the flowchart of FIG. 6 is executed when each position signal Ps is inputted. Accordingly, when estimated phase angle θSm advances relative to the actual phase, the phase shift determination process is executed at step S120. Inversely, when the actual phase advances relative to estimated phase angle θSm, the next position signal Ps is inputted before estimated phase angle θSm reaches the absolute value of the phase at the time when position signal Ps is inputted to correct estimated phase angle θSm to the actual phase angle (correcting process).

Subsequently, the current lower processing is discussed with reference to a flowchart of FIG. 7.

At step S201 control unit 8 reads torque signal Vt. At step S202 control unit 8 calculates a reference command current Im0 based on torque signal Vt. The processing at steps S201 and S202 is particularly executed at command current calculator 81 of control unit 8.

At step S203 control unit 8 determines whether or not the phase shift occurs. When the determination at step S203 is affirmative, that is, when the phase shift occurs, the program proceeds to step S204. When the determination at step S203 is negative, that is, when no phase shift occurs, the program proceeds to step S209. The phase shift determination of step S203 is executed on the basis of the determination result of step S120 shown in FIG. 6.

At step S204 control unit 8 determines whether or not the rotational direction of motor 7 is maintained (unchanged). When the determination at step S204 is affirmative, that is, when the rotational direction of motor 7 is not changed, the program proceeds to step S205. When the determination at step S204 is negative, that is, when the rotational direction of motor 7 is changed, the program proceeds to step S209. That is, when the rotational direction of motor 7 is changed as a result of changing the steering direction, it becomes unnecessary to execute the current lowering processing based on the detected torque. Therefore, the program proceeds to step S209. Further, when the rotational direction of motor 7 is changed due to the shortage of the assist force, the program also proceeds to step S209. If the current lower processing is executed under the assisting-force shortage condition, the shortage of the assisting force is further amplified. Therefore, under this assisting force shortage condition, the control unit 8 makes the negative determination at step S204.

This rotational change determination is executed on the basis of position signal Ps. Referring to FIG. 11, when motor 7 is rotating such that the position signal indicative of the absolute value of the predetermined angular position changes from Ps1 to Ps2, if the next position signal Ps3 subsequent to the position signal Ps2 is inputted, control unit 8 determines that motor 7 is rotating without changing the rotational direction. On the other hand, when position signal Ps2 is again inputted after the second position signal Ps2 is inputted, control unit 8 determines that the rotational direction of motor 7 is changed. In this embodiment, control unit 8 executes the determination as to the change of the rotational direction of motor 7 at the time when position signal Ps is inputted subsequently.

At step S205 control unit 8 determines whether or not an increased quantity of the absolute value of torque signal Vt is smaller than a preset value ΔVtlim from the start of the current lowering process executed at step S208. When the determination at step S205 is affirmative, that is, when the increased quantity |Vt−VtST| of the absolute value of torque signal Vt is smaller than preset value ΔVtlim wherein VtST is a torque signal at each start point of the estimated phase angle point, the program proceeds to step S206. When the determination at step S205 is negative, that is, when the increased quantity of the absolute value of torque signal Vt becomes greater than a preset value ΔVtlim, the program proceeds to step S209. That is, step S205 is executed to prevent the shortage of the assisting force from being generated by the current lowering process. After the current lowering processing is started, the increased quantity of the absolute value of the detected torque becomes greater than the preset value ΔVtlim, the current lowering process is suspended to prevent the generation of the shortage of the assisting force.

At step S206 subsequent to the affirmative determination at step S205, control unit 8 determines whether or not a changing state of the absolute value of the torque signal Vt is changed from a decreasing state to an increasing state. That is, control unit 8 checks whether the changing state corresponds to a change from a relationship Vt(n−1)≦Vt(n−2) to a relationship Vtn>Vt(n−1) or a change from a relationship Vt(n−1)≧Vt(n−2) to a relationship Vt(n)<Vt(n−1). When the determination at step S206 is affirmative, that is, when the changing state is changed from the decreasing state to the increasing state, the program proceeds to step S209. When the determination at step S206 is negative, that is, when the changing state is not changed from the decreasing state to the increasing state, the program proceeds to step S207 to execute the current lowering process.

At step S207 control unit 8 executes the calculation of a current lowering ratio K. More specifically, current lowering ratio K is set at a value Kid (K=Kid). Although value Kid is a predetermined fixed value, it may be determined according to the absolute value of torque signal Vt and a current value detected by current detector 84. Further, value Kid may be determined on the basis of a time period elapsed from the phase determination at step S120.

At step S208 control unit 8 executes the current lowering processing for producing a command current Im, which is smaller than reference command current Im0, by multiplying current lowering ratio K and reference command current Im0 (Im=K×Im0). After the execution of step S208, the program returns to step S205.

On the other hand, at step S209, control unit 8 executes a command current setting process wherein command current calculator 81 of control unit 8 employs reference command current Im0 as command current Im.

Subsequently, the manner of operation of the second embodiment of the present invention is discussed.

When there is not occurred a phase shift that estimated phase angle θSm advances relative to the actual phase, that is, when estimated phase angle θSm delays relative to the actual phase angle or when estimated phase angle θSm corresponds to the actual phase angle, the absolute value correction processing is executed as an interruption routine before the program represent by the flowchart of FIG. 6 proceeds to step S120, and the phase shift determination is not made. Accordingly, in the current lowering processing shown in FIG. 7, the program proceeds in the order of step S201, step S202, step S203, and step S209, so that the normal power assist control is executed.

Subsequently, there will be discussed an operation in case that there is occurred the phase shift that estimated phase angle θSm advances relative to the actual phase angle, with reference to a time chart shown in FIGS. 8A through 8D. In this operation, it is assumed that steering wheel is steered in the right direction.

When steering wheel 1 is steered during a period A in FIGS. 8A through 8D and when the phase shift is occurred during a period B such that estimated phase angle θSm shown by a continuous line advances relative to the actual phase shown by a dotted line, toque signal Vt is increased due to the shortage of the assisting force. In response to the increase of torque signal Vt, command current calculating section 81 of control unit 8 increases command current Im.

When the phase shift is occurred during the period B, at time t1 in FIG. 8B estimated phase angle θSm reaches a value obtained by adding 60° to the absolute value of phase angle at the switching (a moment that position signal Ps1 is inputted). Therefore, the phase angle estimating processing shown in FIG. 6 proceeds in the order of step S101, step S102, step S103 and step S120, and control unit 8 makes the phase shift determination. Then, at time when the next position signal Ps2 is inputted, that is, at a start of a period C in FIGS. 8A through 8D, control unit 8 determines that a right directional steering of steering wheel 1 is continued and no inverse steering is executed, the program in FIG. 7 proceeds in the order of step S203, step S204 and step S205. Further, at this time, a change quantity of torque signal Vt is smaller than limit value Vtlim and the change of the torque is not changed from decreasing to increasing. Therefore the program in FIG. 7 proceeds in the order of step S205, step S206 and step S207, so that the current lowering processing is executed after the current lowering ratio K is calculated.

By the execution of the current lowering processing, command current Im is set at a value shown by a continuous line, which is smaller than a value determined based on torque signal Vt shown by a dotted line, during the period C in FIG. 8D. By this setting of command current Im, torque signal Vt indicative of a reaction force of steering wheel 1 and shown by a continues line takes a value close to a target value as compared with the torque signal in the case that the current lowering processing is not executed, which is shown by the dotted line as shown in FIG. 8A.

Figure 7:
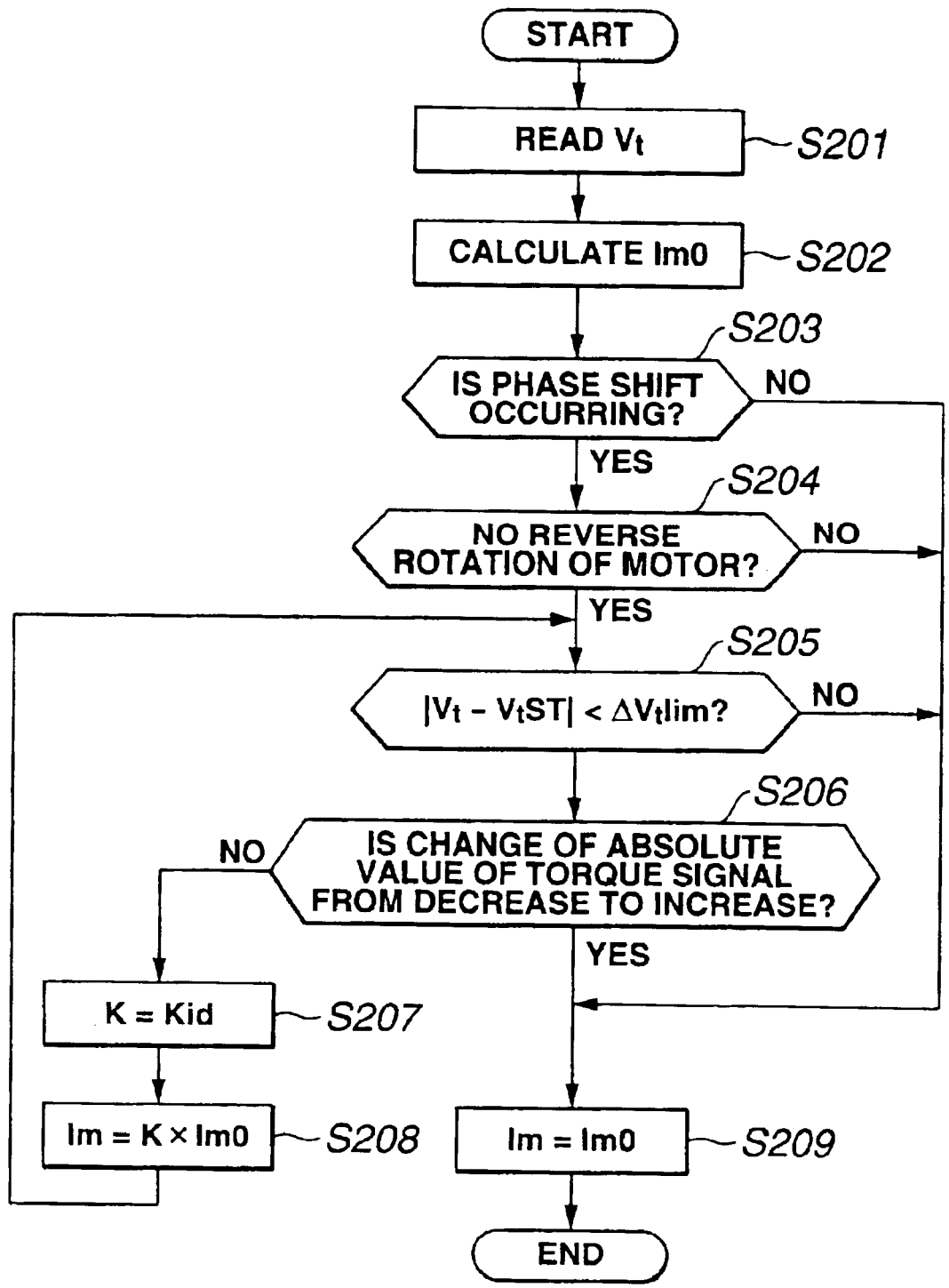
FIG. 7 is a flowchart showing a current returning processing executed in the second embodiment.

The current lowering processing is terminated at time t2 when the change of the absolute value of torque signal Vt is changed from decreasing to increasing, as control unit 8 makes the affirmative determination at step S206 so that that program in FIG. 7 proceeds from step S206 to step S209.

At step S209, there is executed a processing of employing a command current Im0 calculated based on torque signal Vt at command current calculator 81 as command current Im. That is, by terminating the current lowering processing at time when torque signal Vt again increases, the convergence of command current Im to the target value is highly achieved.

Thus, by executing the current lowering processing and by appropriately terminating the current lowering processing, it becomes possible to converge torque value Vt to the target value. Accordingly, it becomes possible to prevent a hunting of the reaction force due to the excessive assisting force generated by the related correction method as to the phase shift and the absolute value of the steering angle, and therefore the driver can execute a steering operation without having a strange feeling.

Further, when the current lowering processing is executed, command current Im is lowered so as to be smaller than the value corresponding to the torque signal Vt detected by torque sensor 9 and therefore the assisting force is decreased. This decrease of the assisting force suppresses the excessive assisting force to the actual phase angle. Further, when the shortage of the assisting force is generated by the current lower processing, the current lowering processing is terminated, and therefore the shortage of the assisting force is solved.

More specifically, in the event that the torque is increased after starting the current lowering processing, if the increase of torque signal Vt is greater than the set value ΔVtlim, the program in FIG. 7 proceeds in the order of step S201, step S202, step S203, step S204, step S205 and step S209. Therefore, the program returns to the normal assist control. Further, in the event that motor 7 is inversely rotated due to the shortage of the torque, the program in FIG. 7 proceeds in the order of step S201, step S202, step S203, step S204 and step S209. Therefore, the routine also returns to the normal assist control.

Referring to FIGS. 9A through 9D, there is discussed a third embodiment of the brushless motor control system according to the present invention. The third embodiment is also adapted to the power steering apparatus of a motor-operated hydraulic type.

This third embodiment is specifically arranged to execute both of the estimated phase angle returning processing and the current lowering processing. Further, the estimated phase angle returning processing is executed when the phase shift is occurred and when the phase estimation is executed. The basic construction of the third embodiment is basically the same as the first embodiment shown in FIGS. 1 and 2, and therefore the explanation thereof is omitted herein.

In the third embodiment, the estimated phase angle returning processing is executed on the basis of the flowchart shown in FIG. 3 of the first embodiment, and the current lowering processing is executed on the basis of the flowchart shown in FIG. 7 of the second embodiment. The phase angle estimation processing of the third embodiment is executed based on a flowchart shown in FIG. 3 of the first embodiment. The flowchart shows the motor angular speed estimation processing executed by angular speed estimator 82 of control unit 8 and the phase estimation processing executed by phase estimator 83 of control unit 8. The phase angle estimation processing employed in the third embodiment is also the same as that employed in the first embodiment, which processing has been explained with reference to FIG. 11. Therefore, the explanation of this phase angle estimation processing is also omitted herein.

Subsequently, the manner of operation of the third embodiment is discussed.

FIGS. 9A through 9D is a time chart showing an operation in case that both of the estimated phase angle returning processing and the current lowering processing are executed. In this operation, it is assumed that steering wheel 1 is steered in the right direction (plus direction).

As shown in FIGS. 9A through 9D, the phase shift is occurred by the advance of the estimated phase angle relative to the actual phase angle during the period B as shown by the period from Ps2 to Ps3 in FIG. 11 as a result that the actual angular speed is decreased due to a fluctuation of the load generated by the steering operation during the period A.

At the time t11 when estimated phase angle θSm reaches the sum (corresponding to the next detected actual phase angle at next switching) of the phase absolute value at switching and 60° due to the phase shift between the actual phase and the estimated phase angle during the period B, if the next position signal Ps12 is not yet generated, the program of FIG. 3 proceeds in the order of step S101, step S102, step S103 and step S104, (in case of the inverse direction, the program proceeds in the order of step S101, step S105, step S106 and step S107 so as to execute the estimated phase angle returning processing. By the execution of the estimated phase angle returning processing, estimated phase angle θSm is decreased. This decrease of estimated phase angle θSm is terminated at the time when estimated phase angle θSm reaches the intermediate value, which is the sum of the phase absolute value at switching and 30°, and is maintained at this intermediate value.

As a result of returning estimated phase angle θSm to the intermediate value, estimated phase angle θSm shown by the continuous line is varied so as to first approach the actual phase shown by the dotted line, to then cross with the dotted line and to finally take a value smaller than the actual phase during the period B as shown in FIG. 9B. Further, when estimated phase angle θSm is returned in the maximum degree by the execution of the estimated phase angle returning process, estimated phase angle θSm reaches the intermediate value of 30°.

As discussed above, although estimated phase angle θSm finally takes a value smaller than the actual phase angle in the operation shown in FIGS. 9A through 9D, estimated phase angle θSm always crosses with the actual phase angle and then reaches the intermediate value as maximum. Further, the intermediate value can generate the torque corresponding to that generated by the conventional 120° power supply method, relative to the motor phase angle of the next switching timing. That is, the intermediate value, which is a value obtained by returning the absolute value determined at the input of the next position signal Ps12 by 30°, has a maximum shift angle 30° even if it is maximally shifted relative to the actual phase toward the plus side or minus side. Accordingly, the output torque ensures cos 30°(≈0.87) of the torque, even if the maximum phase shift is generated. This is apparently effective as compared with cos 60°(=½) of the torque in case of the maximum phase shift in the conventional art.

Therefore, the arrangement of the third embodiment enables torque signal Vt to be set small and the command current to be also set small, as compared with the arrangement of the second embodiment that estimated phase angle θSm is kept at the phase absolute value at the time when the next position signal Ps12 is inputted. Consequently, the arrangement of the third embodiment prevents the generation of over current.

Then, as is shown during the period C in FIGS. 9A through 9D, at the time when position signal Ps12 is inputted and when the actual phase angle is obtained, the estimated phase angle returning processing is terminated, and the current lowering processing is started.

Herein, the third embodiment is arranged to calculate a shift quantity between the actual phase angle and estimated phase angle θSm and to calculate current lowering ratio K based on the calculated shift quantity at step S207 for calculating current lowering ratio K.

By the execution of the current lower processing during the period C, it becomes possible to prevent the hunting generated by the further radial reaction force, and therefore it becomes possible to prevent a driver from having a strange feeling from this operation.

As is similar to the second embodiment, the current lowering processing is terminated at the time t12 when the change of torque signal Vt changes from the decrease to the increase.

With the thus arranged third embodiment according to the present invention, it becomes possible to suppress a shift quantity between the actual phase angle and the estimated phase angle, by employing Hall-effect sensors of detecting the phase angle by 60° as phase detecting means and by executing the estimated phase angle returning processing. Additionally, by executing the current lowering processing, it becomes possible to prevent the excessive assist. That is, the third embodiment according to the present invention enables executing the effective operation while producing the system inexpensively and improving the torque control quality by suppressing the fluctuation of the torque in the control of the power steering apparatus.

Although the invention has been described above by reference to certain embodiments of the invention, the invention is not limited to the embodiments described above. Modifications and variations of the embodiments described above will occur to those skilled in the art in light of the above teachings. For example, although the embodiments according to the present invention have been shown and described such that the brushless motor control system according to the present invention is adapted to the power steering apparatus, this brushless motor control system may be applied to other apparatus such as a conveying apparatus for conveying objects, as far as the applied apparatus requires to control the current to a motor while detecting a motor phase using Hall-effect sensors, and to control the magnitude of the command current based on the detected torque of an operating member. Further, although the embodiments according to the present invention have been shown and described such that a main manipulating force inputted to the input member is a manipulating force of a driver, it is not limited to the manpower and may be arranged such the power of other power source may be inputted as a main manipulating force.

Further, although the embodiments according to the present invention have been shown and described such that brushless motor 7 having three-phase coils is employed as a driving source of pump 6 and the assisting force is generated by hydraulic cylinder 5, the driving force of motor 7 may be directly inputted to the input member or indirectly through a speed reducer to the input member. Further, brushless motor 7 may not be limited to a three-phase coil type, and may employ other multi-phase coil type.

Furthermore, although the third embodiment according to the present invention has been shown and described such that the phase returning process is executed so as to return the estimated phase angle to the intermediate value which is a value obtained by returning the phase absolute value obtained at the time when the next position is inputted by 30°, the retuned quantity may not limited to this, and a value nearer to the phase absolute value as compared with the intermediate value may be employed. Further, although the embodiment according to the present invention has been shown and described such that the phase of the rotor is detected by each 60° by means of Hall-effect sensors, the angle interval may not be limited to 60°.

Although the third embodiment has been shown and described such that the return change quantity $\Delta\theta m$ such that a product $\Delta\theta n$ of a value obtained based on the previous angle speed $\omega$ and the control cycle time is employed as return change quantity $\Delta\theta m$, the invention is not limited to this, and a predetermined value may be employed as return change quantity $\Delta\theta m$.

This application is based on prior Japanese Patent Applications Nos. 2002-179631 and 2002-182654. The entire contents of the Japanese Patent Applications No. 2002-179631 with a filing date of Jun. 20, 2002 and No. 2002-182654 with a filing date of Jun. 24, 2002 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A motor control system comprising:
   a brushless motor having multi-phase coils, the brushless motor generating a torque for assisting the operation of an input member;
   a phase detector detecting an actual phase angle of a rotor of the brushless motor at predetermined angle intervals; and
   a control unit connected to the brushless motor and the phase detector, the control unit being arranged
      to calculate an estimated phase angle on the basis of the actual phase angle and an elapsed time from the detection moment of the actual phase angle detected by the phase detector,
      to control a command current indicative of a current to be supplied to the brushless motor on the basis of the estimated phase angle and the actual phase angle,
      to detect an advance of the estimated phase angle relative to the actual phase angle, and
      to execute at least one of an estimated phase angle returning processing for returning the estimated phase angle and a current lowering processing for lowering the command current, when the estimated phase angle advances relative to the actual phase angle.

2. The motor control system as claimed in claim 1, wherein the control unit is further arranged to execute the estimated phase angle returning processing to return the estimate phase angle from a first value corresponding to a next detected phase angle to a second value corresponding to the present detected phase angle when the estimated phase angle reaches the first value before the phase detector detects the next detected phase angle.

3. The motor control system as claimed in claim 2, wherein the phase detector detects the actual phase angle at 60° intervals, and the control unit gradually returns the estimated phase angle to an intermediate value which is the sum of the previous detected phase and 30° in the estimated phase angle returning processing.

4. The motor control system as claimed in claim 2, wherein the control unit is further arranged to supply the currents of sine wave to each phase of the brushless motor at the right angle relative to the phase angle of the rotor.

5. The motor control system as claimed in claim 3, wherein the control unit is further arranged to return the estimated phase angle to the intermediate value on the basis of an angular speed of the motor.

6. The motor control system as claimed in claim 1, wherein the control unit is further arranged to execute the current lowering processing to lower the current at a value smaller than a reference command current corresponding to a normal torque, when the estimated phase angle advances relative to the actual phase angle.

7. The motor control system as claimed in claim 6, wherein the input member includes a steering member for transmitting a power from a steering wheel to front wheels, the input member receiving an assisting force generated by the brushless motor, the control unit being further arranged to detect a reaction force of the steering wheel.

8. The motor control system as claimed in claim 6, wherein the control unit is further arranged to terminate the current lowering processing when a change of an absolute value of the detected torque is varied from decreasing to increasing after the current lowering processing is started.

9. The motor control system as claimed in claim 6, wherein the control unit is further arranged to suspend starting the current lowering processing when a rotational direction of the brushless motor is changed even after the phase angle shift is detected.

10. The brushless motor control system as claimed in claim 6, wherein the control unit is further arranged to terminate the current lowering processing when the change quantity of the absolute value of the detected torque is greater than a predetermined value after the current lowering processing is started.

11. The brushless motor control system as claimed in claim 6, wherein the control unit is further arranged to calculate a magnitude of the phase angle shift between the estimated phase angle and the actual phase angle, to increase a ratio of lowering the current to be supplied to the brushless motor according to the increase of the magnitude of the phase angle shift and to decrease the ratio of lowering the current according to the decrease of the magnitude of the phase angle shift.

12. The brushless motor control system as claimed in claim 6, wherein the control unit is further arranged to return the estimated phase angle from the next detected phase angle to the present detected phase angle by a predetermined quantity when the estimated phase angle has already reached the next detected phase angle and when the next detected phase angle has not detected.

13. A motor control system comprising:
   a brushless motor having multi-phase coils, the brushless motor generating a torque for assisting the operation of an input member;
   a phase detector detecting an actual phase angle of a rotor of the brushless motor by a predetermined angle; and
   a control unit connected to the brushless motor and a phase angle detector, the control unit being arranged
      to calculate an estimated phase angle based on the actual phase angle detected by the phase detector and an elapsed time from the detection moment of the phase detector, to control a supply current supplied to the brushless motor on the basis of the estimated phase angle and the actual phase angle, and to execute an estimated phase angle returning processing for returning the estimated phase angle from a reached value corresponding to a next detected phase angle to a returned value corresponding to a present detected phase angle when the estimated phase angle reaches the reached value before the phase detector detects the next detected phase angle.

14. A motor control system comprising:

an input member through which a main manipulating force is inputted;

a brushless motor having multi-phase coils, the brushless motor generating a torque for assisting the operation of the input member;

a phase detector detecting an actual phase angle of a rotor of the brushless motor by a predetermined angle;

a torque detector detecting a toque indicative a reaction force generated at the input member; and a control unit connected to the brushless motor, the phase detector and the torque detector, the control unit being arranged to calculate an estimated phase angle based on the actual phase angle detected by the phase detector and an elapsed time from the detection moment of the phase detector, to control a command current indicative of a current to be supplied to the brushless motor on the basis of the estimated phase angle and the actual phase angle, to vary the command current according to the torque, to calculate an advance of the estimated phase angle relative to the actual phase angle, and to execute a current lowering processing for lowering the command current so as to be smaller than a reference command current corresponding to a normal torque, when the estimated phase angle advances relative to the actual phase angle.

15. A method of controlling a brushless motor having multi-phase coils, the brushless motor generating a torque for assisting the operation of an input member, the method comprising the steps of:

detecting an actual phase angle of a rotor of the brushless motor at predetermined angle intervals; and calculating an estimated phase angle based on the detected actual phase angle detected by the phase detector and an elapsed time from the detection moment of the phase detector;

controlling a command current indicative of a current to be supplied to the brushless motor on the basis of the estimated phase angle and the actual phase angle;

detecting an advance of the estimated phase angle relative to the actual phase angle; and executing at least one of an estimated phase angle returning processing for returning the estimated phase angle and a current lowering processing for lowering the command current, when the estimated phase angle advances relative to the actual phase angle.

* * * * *